United States Patent [19]

Marks et al.

[11] Patent Number: 4,654,443

[45] Date of Patent: Mar. 31, 1987

[54] HYDROLYSIS OF ISOCYANATE DISTILLATION BOTTOMS

[75] Inventors: Maurice J. Marks; James R. Porter; Raymond A. Plepys, all of Lake Jackson, Tex.

[73] Assignee: The Dow Chemical Company, Midland, Mich.

[21] Appl. No.: 710,660

[22] Filed: Mar. 11, 1985

[51] Int. Cl.$^4$ .............. C07C 87/50; C07C 85/11; C07C 87/14
[52] U.S. Cl. .............................. 564/305; 564/330; 564/334; 564/448; 564/511
[58] Field of Search ............... 564/305, 330, 334, 448, 564/511; 260/453 PH

[56] References Cited

U.S. PATENT DOCUMENTS 3,225,094 12/1965 Wolf .................................. 563/330
3,499,035 3/1970 Kober et al. .................. 260/453 PH

FOREIGN PATENT DOCUMENTS 2703313 8/1978 Fed. Rep. of Germany .
2378748 1/1978 France .

Primary Examiner—Charles F. Warren
Assistant Examiner—John A. Sopp

[57] ABSTRACT

Liquid distillation residue formed in the phosgenation of polyamines to form polyisocyanates are hydrolyzed to reform the polyamine. The process comprises forming an adduct of the distillation residue with additional polyamine and then hydrolyzing the resulting adduct to convert the adduct to said polyamine.

8 Claims, No Drawings

HYDROLYSIS OF ISOCYANATE DISTILLATION BOTTOMS

BACKGROUND OF THE INVENTION

This invention relates to a process wherein distillation residue produced in the phosgenation of a polyamine is recovered in reusable form. More particularly this invention relates to a process whereby said distillation residue is reconverted to the original polyamine in high yield.

In the phosgenation of polyamines to form polyisocyanates, the product polyisocyanate is generally distilled from the reaction mixture in which it is prepared. At the conclusion of the distillation, the reaction mixture normally contains a quantity of high boiling residue. Such residue generally comprises polymeric materials such as biurets, polycarbodiimides, diisocyanatocarbodiimides, polyuretdiones, isocyanurates and the like. Since this residue is not commercially useful it must be recycled or disposed of.

In theory, all such residue should be hydrolyzable to regenerate polyamines. In practice, however, complete hydrolysis has not been achieved due to the formation of insoluble lumps or masses which at best hydrolyze too slowly for commercially application.

It is known to use aqueous alkali metal hydroxide solutions to promote the hydrolysis of the distillation residue. However, such solutions fail to provide a decomposition product of uniform composition. In addition, such base-catalyzed hydrolysis reaction has not proceded in good yield nor has it solved the problem of insoluble lump formation.

In West German Pat. No. 2,703,313 it is taught to hydrolyze solid undistillable residue with aqueous ammonia or a primary or secondary amine solution. The primary or secondary amine may be the polyamine used in the preparation of the polyisocyanate, but the use of such polyamine is clearly stated not to be preferred.

Although the process of German Pat. No. 2703313 largely overcomes the problem lump formation and provides better yields than previous processes, several disadvantages remain. That process requires the addition of reagents or solvents in effecting the hydrolysis, which reagents or solvents must later be removed. Even though the polyamine used in preparing the polyisocyanate is said to be useful in the hydrolysis reaction, other materials such as ammonia, organic solvents, and ε-caprolactan are normally used in connection therewith. In addition, the yield of this process to polyamine is only about 50-70%, which is much lower than desirable.

It would be desirable to provide a process for the hydrolysis of distillation residue from the phosgenation of the polyamine, whereby a high yield of regeneration of the polyamine is achieved without the formation of substantial amounts of by-products.

SUMMARY OF THE INVENTION

This invention is a process for the hydrolysis of liquid distillation residue formed in the reaction of a polyamine with phosgene to form a polyisocyanate. This process comprises (a) contacting such distillation residue, containing sufficient monomeric polyisocyanate that the residue is a liquid, with an aqueous solution of the polyamine under conditions such that an adduct of said polyamine and liquid distillation residue is formed and (b) reacting said polyamine-distillation residue adduct with at least 1 equivalent of water per equivalent of distillation residue containing said adduct, under conditions such that said adduct is hydrolyzed to regenerate the polyamine.

The process of this invention provides a product polyamine in good yield, usually 90% or higher and often more than 98%. In addition this process requires as reagents only water and the same polyamine as is recovered as the product. The only significant by-product of this reaction is carbon dioxide, which readily separates from the reaction mixture by virtue of its being a gas. This process does not result in the formation of significant amounts of ammonium compounds and carbonates which must be subsequently removed from the product polyamine.

DETAILED DESCRIPTION OF THE INVENTION

The liquid distillation residue employed herein is formed in the phosgenation of a polyamine to form a polyisocyanate. In such reaction, the product polyisocyanate is removed from the reaction mixture by distillation. The distillation residue is that portion of the reaction mixture which remains following the removal of substantially all of the product polyisocyanate. However, the distillation residue employed herein contains a quantity of the polyisocyanate such that the distillation residue is a liquid.

Such distillation residue generally comprises mixtures of materials such as polyureas, biurets, polycarbodiimides, polyuretdionies, isocyanurates, diisocyanatocarbodiimides, addition products of monomeric diisocyanates into carbodiimides and polyisocyanates that have polyuretdions groups. Such materials usually contain free or capped isocyanate groups.

Preferably, the distillation residue is that material which remains after the distillation of crude 2,4-and/or 2,6-toluenediisocyanate (TDI); 2,4'- and/or 4,4'-diisocyanatodiphenylmethane (MDI); polymeric MDI; hexamethylenediisocyanate; 3,3,5-trimethyl-5-isocyanatomethyl cyclohexylisocyanate and the like from their respective reaction mixtures. Most preferred are residues from the preparation from 2,4- and/or 2,6-toluenediisocyanate.

As stated before, the distillation residue used in this process contains some free diisocyanates which are not readily removed by distillation. In addition, the distillation residues may have a total —NCO content of up to about 30% by weight, preferably from about 10 to 25% by weight.

In the first step according to the process of this invention, the distillation residue is contacted with a aqueous solution of the polyamine which is used in the preparation of the polyisocyanate and which is the desired product of the present process. This contact is carried out under conditions such that an adduct of the polyamine and a portion of the distillation residue is formed.

At least a catalytic amount of the polyamine is used in forming the adduct with the distillation residue. On the other hand, the use of large quantities of polyamine, i.e. about a stoichiometric amount thereof based on the —NCO content of the distillation residue, causes cross-linking in the adduct and substantially reduces yields. In general, about 0.01 to about 1 equivalent of the polyamine are used per equivalent distillation residue in forming the adduct. The formation of the adduct is greatly speeded when about 0.03–0.4 equivalent of polyamine are used per equivalent distillation residue. In a less preferred variation, the polyamine can be generated in situ by initial hydrolysis of the distillation residue and water, forming polyamine which forms the required adduct. However, it is preferred to add polyamine to the distillation residue.

The temperature at which the polyamine-distillation residue adduct is formed is chosen such that the adduct is formed. Advantageously, the temperature is between 25° and 350° C., preferably 80° to 250° C. and more preferably about 80° to 100° C. The time required to prepare said adduct is in the range from about 10 to 30 minutes at a reaction temperature of 80° to 90° C. Less time is required when higher temperatures are employed. The resulting adduct is generally a granular solid.

Following the formation of the polyamine-distillation residue adduct, the adduct is hydrolyzed with water. In the hydrolysis step, at least one, preferably at least two equivalents of water are required per equivalent of distillation residue employed in preparing the adduct. The use of a lesser amount of water will result in the incomplete hydrolysis. Normally, however, a substantially greater amount of water is used. Typically, sufficient water is used so that a stirrable slurry of the granular adduct in the water is used. Generally, such slurry contains about 30% or less by weight of adduct of the of the hydrolysis reaction. The use of these greater amounts of water also substantially speeds the rate of reaction.

The temperature of the hydrolysis reaction is advantageously about 160° to 350° C. and preferably 160° to 250° C. The rate of reaction is temperature dependent, with higher temperatures providing a faster reaction. Typically, complete hydrolysis is achieved in about 5 to 300 minutes at 250°–350° C. and in about 15–600 minutes at 160°250° C.

Advantageously and preferably, the adduct formation and hydrolysis reaction are carried out by mixing together the distillation residue, polyamine and water and heating to the temperature required for the hydrolysis reaction. Since the adduct-forming reaction proceeds more rapidly than the hydrolysis reaction, the adduct is substantially formed before the hydrolysis commences.

The only major products of the hydrolysis reaction are the polyamine and carbon dioxide. Since carbon dioxide escapes as a gas, the product polyamine can usually be dewatered and recycled for use in a subsequent phosgenation reaction without subsequent purification. Thus, the process of this invention provides a means for preparing a polyamine from distillation residue without the formation of substantial amounts of byproducts. Typically, the yield of polyamine achieved with this process is in excess of 90% and is often in excess of 98%. Essentially quantitative conversion of the undistillable residue to polyamine can be achieved with the process of the invention.

The process according to this invention may be carried out continuously or batchwise. When carried out batchwise it is preferred to use an autoclave. In a continuous process, a tubular reactor may be used wherein the distillation residue and polyamine solution are fed into the reactor. The reaction is then carried out in the reactor such that the polyamine-distillation residue adduct is formed followed by hydrolysis of the adduct to regenerate the polyamine. It is noted that in either the continuous or batchwise process the polyamine may be added as an aqueous solution or dispersion. In such case, the water required in the hydrolysis may be that in which the polyamine is dissolved prior to the reaction with the distillation residue. Alternatively, additional water may be added to the reaction mixture following the formation of the polyamine- distillation residue adduct in order to carry out the hydrolysis reaction.

As stated hereinbefore, the product polyamine may be employed to prepare polyisocyanates. Alternatively the product can be used as a raw material in the preparation of polyurea polymers. Other uses for the product polyamine will of course be apparent to those skilled in the relevant arts.

The following example is provided to illustrate the invention but is not intended to limit the scope hereof. All parts and percentages are by weight unless otherwise indicated.

EXAMPLE 1

Into a 2-liter beaker are added 400 grams of a 5% aqueous solution of a mixture of 2,4- and 2,6-toluenediamine (TDA). With stirring, the toluenediamine is heated to 80°–90° C. and to it are slowly added 100 grams of distillation residue from the phosgenation of a mixture of TDA isomers. The TDA-distillation residue adduct forms rapidly, first becoming a thick paste and then becoming hard and granular. A small amount of carbon dioxide evolution occurs, indicating a minor amount of hydrolysis. A portion of the aqueous phase is analyzed following the formation of the adduct. Analysis shows that the concentration of TDA in the solution has decreased from 5% to 4%, further verifying the formation of an adduct with the distillation residue.

A 25 gram sample of the solid adduct is placed in a 2-liter Parr high pressure reactor equipped with a stirrer, along with 225 grams of deionized water. The reactor is sealed and heated to 250° C., developing a pressure of about 580 psi inside the reactor. As the hydrolysis reaction begins, the pressure inside the reactor increases due to the evolution of carbon dioxide. Hydrolysis of the adduct is complete within fifteen minutes at 250° C. Analysis of the hydrolyzed product indicates that the reaction proceeds to 100% yield.

What is claimed is:

1. A process for producing organic polyamines comprising the steps of (a) contacting liquid distillation residue from the phosgenation of a polyamine with an aqueous solution or dispersion of said polyamine under conditions such that an adduct of said polyamine and distillation residue is formed, and (b) reacting said polyamine-distillation residue adduct with at least one equivalent of water per equivalent of distillation residue contained in said adduct under conditions such that said adduct is hydrolyzed to form said polyamine, wherein steps (a) and (b) are conducted under conditions such that the polyamine-distillation residue adduct forms before substantial hydrolysis of the mixture occurs, and the yield of polyamine, based on the distillation residue, is in excess of 98%.

2. The process of claim 1 wherein the distillation residue contains a quantity of free polyisocyanate in an amount such that the residue has an —NCO content of about 10 to about 25 percent by weight.

3. The process of claim 1 wherein step (a) is conducted at a temperature of about 80° to 250° C.

4. The process of claim 3 wherein step (b) is conducted at a temperature from about 160° to 350° C.

5. The process of claim 4 wherein in step (a) about 0.03 to 0.4 equivalent of polyamine is contacted with each equivalent of distillation residue.

6. The process of claim 5 wherein sufficient water is employed in step (b) to form a stirrable slurry of the polyamine-distillation residue adduct therein.

7. The process of claim 6 wherein the polyamine is 2,4-toluenediamine, 2,6-toluenediamine or mixtures thereof.

8. The process of claim 6 wherein the polyamine is 4,4'diisocyanatodiphenylmethane, 2,4'diisocyanatodiphenylmethane or mixtures thereof.

* * * * *